US009143552B2

(12) United States Patent
Bonner et al.

(10) Patent No.: US 9,143,552 B2
(45) Date of Patent: Sep. 22, 2015

(54) DYNAMIC PROFILE MANAGEMENT BASED ON TRANSPORT DETECTION

(75) Inventors: Thomas W. Bonner, Smyrna, GA (US); Judson John Flynn, Decatur, GA (US); Scott Allen Swanburg, Duluth, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1253 days.

(21) Appl. No.: 11/727,494

(22) Filed: Mar. 27, 2007

(65) Prior Publication Data

US 2007/0291683 A1 Dec. 20, 2007

Related U.S. Application Data

(60) Provisional application No. 60/814,048, filed on Jun. 16, 2006.

(51) Int. Cl.
*H04W 4/00* (2009.01)
*H04L 29/08* (2006.01)
*H04L 29/06* (2006.01)
*H04W 88/06* (2009.01)

(52) U.S. Cl.
CPC .............. *H04L 67/06* (2013.01); *H04L 67/30* (2013.01); *H04L 67/32* (2013.01); *H04L 69/24* (2013.01); *H04W 88/06* (2013.01)

(58) Field of Classification Search
CPC .......... H04N 9/8205; H04N 21/43615; H04N 21/43637; H04N 5/765; H04N 21/43635; H04N 21/8586; H04N 5/772; H04N 9/8042; H04N 21/4334; H04N 5/38; H04N 21/4126; H04N 21/41407; H04N 21/4147; H04N 21/4227; H04N 21/4307; H04N 21/434; H04W 88/06; H04W 48/18; H04W 84/18; H04W 4/02; H04W 88/02; H04W 88/08; H04W 16/14; H04W 48/16; H04W 74/0816; H04W 76/026; H04W 84/045; H04W 12/06; H04W 16/26; H04W 28/0236; H04W 28/16; H04W 36/28; H04W 48/08
USPC .......... 455/461, 403, 432, 435, 456; 370/328, 370/419, 401; 709/223, 220
See application file for complete search history.

(56) References Cited

U.S. PATENT DOCUMENTS

| 6,522,884 B2 * | 2/2003 | Tennison et al. .............. 455/445 |
| 6,631,136 B1 * | 10/2003 | Chowdhury et al. .... 370/395.31 |
| 8,352,627 B1 * | 1/2013 | Mackie ......................... 709/232 |
| 2002/0099599 A1 * | 7/2002 | Minassian ....................... 705/13 |
| 2003/0078965 A1 * | 4/2003 | Cocotis et al. ................ 709/203 |
| 2007/0135114 A1 * | 6/2007 | Valentino ................... 455/422.1 |
| 2007/0198674 A1 * | 8/2007 | Li et al. ........................ 709/223 |

* cited by examiner

*Primary Examiner* — Mahendra Patel
*Assistant Examiner* — Natasha Cosme
(74) *Attorney, Agent, or Firm* — Hartman & Citrin LLC

(57) ABSTRACT

Systems and methods are presented that enable the transmission of data and applications to a communications device using a most efficient communication pathway. This enables large sized information to be sent to cellular telephones and other devices without using conventional cellular signaling pathways.

7 Claims, 2 Drawing Sheets

DYNAMIC PROFILE MANAGEMENT BASED ON TRANSPORT DETECTION

This U.S. Utility patent application claims priority to U.S. Provisional Patent Application Ser. No. 60/814,048, filed Jun. 16, 2006, the content of which is hereby incorporated by reference in its entirety into this disclosure.

BACKGROUND OF THE INVENTION

1. Field of the Invention

The present invention relates to wireless communication. More particularly, the present invention relates to wireless communication dynamic profile management based on transport detection.

2. Background of the Invention

Modern cellular telephones can carry ever-expanding applications and abilities. Beyond the ubiquitous ability to conduct telephone calls and transmit and receive data and text messages, more telephones are available that can play songs, videos and even receive television signals. This increased ability to perform more sophisticated functions requires ever-increasing memory, storage and bandwidth capability. It also increases the load on the wireless telephone system as large packets of information are being transmitted to and between cellular telephones. This tremendous increase in bandwidth serves to clog up the systems of cellular service providers, as well as to increase the cost of transmission and communication.

Thus, a need exists in the art of wireless communication for creating an efficient, inexpensive, and easy to implement alternative to conventional methods of transmitting large packets of information to and between portable devices to help alleviate the load on the systems of the cellular service provider. Further, such alternative should be able to automatically update the proper form of information to be sent to a user depending on the location of the user.

SUMMARY OF THE INVENTION

The present invention serves to provide a unique and alternative technique for transmitting large packets of information to clients, such as portable devices, by continuously monitoring and using the most efficient and least-expensive pathway to carry information to the portable device. Such monitoring and re-adjusting the information push to the carrier may be performed primarily by network intelligence within network servers, but also may be implemented or assisted by device intelligence as well. In specific examples, using other existing tools for transmitting large amounts of data, namely broadband and WiFi, the present invention transmits large volume data through these alternative and less costly routes when a particular portable device is connected to or within the signal communication of one of these alternative more efficient systems.

Thus, through the use of the present invention large files for data, music, video, television and the like may be transmitted to appropriately-equipped portable electronic devices through cable, DSL, T-1, WiFi or other similar transmission tools to alleviate the large demand on the cellular 2G/3G system.

As used herein and throughout this disclosure, a "portable device" may be any device that can receive packet information or data remotely, including, but not limited to, cellular telephones, personal data assistants (PDA), pagers, handheld receivers, personal computers, and the like. Other devices, not yet developed or marketed, may also fall within the category of a "portable device" as defined herein as long as they can also benefit from the invention as disclosed herein. The scope of the present invention encompasses the use of such future devices as well.

DETAILED DESCRIPTION OF THE INVENTION

Figure 1:
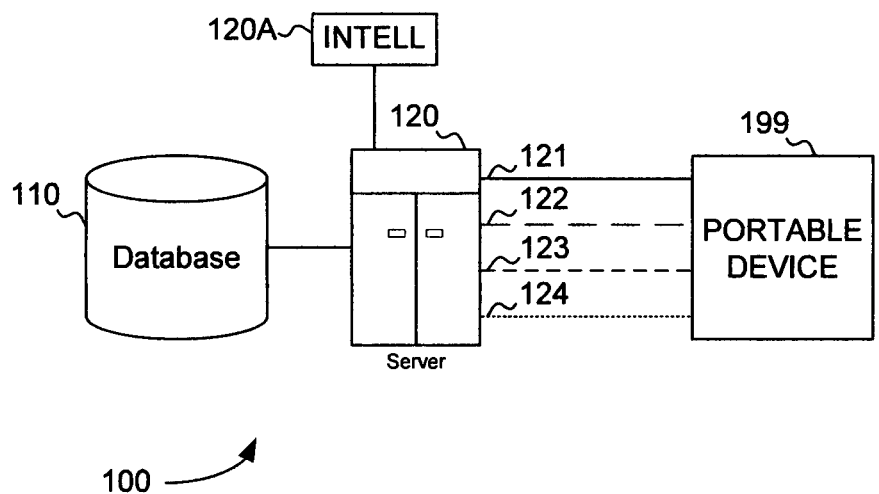
FIG. 1 shows an exemplary intelligent server to portable device link having a number of different communication pathways according to an exemplary embodiment of the present invention.

The present invention makes use of a combination of standards such as Internet Protocol (IP), IP Multimedia Subsystems (IMS), Java client architecture, and a newly defined User Interface that is termed herein and throughout this disclosure as Scenario Based Services (SBS).

IP Multimedia Subsystems (IMS) combined with Session Initiation Protocol (SIP) provide the interoperability and standardization. IMS basically describes a system by which mobile operators can offer and charge for discrete services that are usually available on the internet, alongside current services being offered. This architecture works with any packet-switching network, is IP-based, and therefore has tremendous potential for services like VoIP, push-to-talk, video-conferencing, IM, presence information, etc. An example of a standardized signaling protocol is the Session Initiation Protocol (SIP). SIP allows two elements in a network to find each other and open lines of communication easily, and is a significant part of IMS. Ideally every mobile device and network element has a unique SIP address for the purposes of this disclosure. Interactive applications communicate with the user and among themselves using SIP signaling over an IP network, compile data, and submit patterns to the Intelligent Information Collection Repository (IICR), described in more detail below. Compilation can take place either on the handset or at the server end. In addition, a mobile device for the purposes of this disclosure includes any communications device with the ability to send and receive data across IP or any related packet-based networks, as well as devices capable of communicating over PSTN or other legacy networks.

For the purposes of this invention, the term Scenario Based Services (SBS) is used herein to describe a setup in which a suite of applications is made available for use during differing scenarios and contexts. The intelligent push and pull of applications foster communications across specific communities of interest. The user interface allows for a user defined customizable "desktop" accessing ability for using multiple applications simultaneously. The system can provide a menu of applications for communities of interest, lower cost of implementation through 3rd party software developers, provide higher subscriber retention through a differentiated service, add value through better response to customer needs, and improve granularity for service definitions through customer interaction, among others.

Dynamic Event Server Subsystem (DESS) as used herein is a network system that contains network enabled applications and services to be offered up dynamically to mobile terminals with dependency on contextual usage. New "state" information collected at the DESS may be transmitted to the terminal (or micro) level of the network. The state as well as usage information is eventually stored in a User Profile created in the Intelligent Information Collection Repository (IICR). Multiple levels of communication include interaction between the mobile device/client and the applications server (AS), between multiple application servers, and between multiple servers at which time the subscriber state change is collected and an aggregation server described in this disclosure as the Proxy Registration Authentication Collection (PRAC) server. PRAC Server is the interface to the IMS core, and controls subscriber access to the server hosting a particular application. Network authentication and security functions may be performed prior to engaging the PRAC server. Subscribers may be authenticated based on their current status of active registration for applications on the DESS.

The terms Mobile User, Mobile Subscriber, Consumer, and Customer all mean the same and may be used interchangeably throughout this application. The terms User Profile, Profile, Subscriber Profile, all refer to the profile of the mobile subscriber that is stored in the IICR.

The present invention provides mobile users with the ability to leverage profiling that enables a seamless distribution of varying packet based applications and content with a correlation between the type of content and the network transport. Based on various criteria, such as, for example, proximity and network access, applications and content will be interacted with on a "most productive" basis. Using, for example, intelligence within the network, such as the network server, information is appropriately packaged and then passed on to or programs are interacted with a client through the most efficient and less costly route. The client may have the ability to inform the network of the highest speed access for information that is in proximity to the client, for example, a T-1 line. Alternatively, the client may not have to inform the network of such route, and the network itself has the ability to discern what such most productive route will be and provide information (packaged appropriately for that route) to or interact with the client through such most productive route. Various examples and uses of the present invention are possible and several non-limiting examples will be presented below and with respect to the figures.

An exemplary embodiment of a system according to the present invention is shown in FIG. 1 as system 100. Within system 100, a server 120 is linked to an exemplary database 110 which stores or operates applications. Server 120 can communicate with an exemplary client, such as a portable device 199, using various general pathways 121, 122, 123 and 124, which include transfer bearers such as, but not limited to, T-1 lines, hardwire, remote, wireless, Blue Tooth, WiFi, and the like. As may be gleaned from the exemplary communication pathways 121, 122, 123 and 124 shown in the example, pathway 121, shown as a solid line, is the most efficient because it can transfer a higher volume of information at the fastest rate (and perhaps lowest cost). As an example, pathway 121 may be a T-1 line. In contrast, as the pathways proceed from 121 to 124, the pathway options become less efficient because they transfer information at slower rates (and perhaps higher cost). Thus, it is most ideal to transfer information between server 120 and portable device 199 through a pathway that is higher in efficiency (at or closer to pathway 121) rather than lower in efficiency (at or closer to pathway 124). Pathway 124 may be, for example, any standard cellular communication pathway, which may be the slowest in data transfer, and also highest in cost.

One of the many advantages of the present invention is the ability to dynamically manage the profile of a client, or portable device 199, by automatically determining whether a higher efficiency pathway exists, and if so, then transferring information delivery through such pathway. Such profile management may be performed at the portable device level by a user who can select which pathway is available to the user, such as through a manual selection on the portable device 199 itself. Alternatively, the profile may be dynamically managed by an intelligence module 120A available to the server 120 as a result of communication from the proximity, availability and connectability of portable device 199 to the various pathways 121, 122, 123 and 124. In one exemplary embodiment, intelligence module 120A is an IICR, and together with Server 120, and database 110, is part of a DESS. Alternatively, Intelligence module 120A can be combined with database 110 as part of a DESS, which is in communication with server 120. In either case, the combination of intelligence module 120A and server 120 can dynamically package and present information to the portable device 199 depending on the pathway 121, 122, 123, 124 that is available. Thus, the packaged information being transferred to the portable device 199 from the server 120 will be different if pathway 121 is available rather than if pathway 122 is available, and so forth.

There are several ways of informing the intelligence module 120A that a certain higher efficiency pathway is available for the portable device 199 in order to receive information from the server 120. One such example, which was presented above, is manual instruction by, for example, a user who signals that a given pathway (e.g., such as high speed T-1 lines) is available. In another exemplary embodiment, intelligence module 120A is an IICR that is part of a larger DESS, and contains a user profile for the device 199. IICR will determine the availability of a given pathway by reading the location registry of the portable device 199 as it enters and exits certain locations which have open pathways in communication with the portable device 199. This information is stored in a database within the IICR or DESS, and may be referred to by server 120 to determine the most appropriate pathway. Other ways of informing the intelligence module 120A are also possible and within the scope of the present invention.

Figure 2:
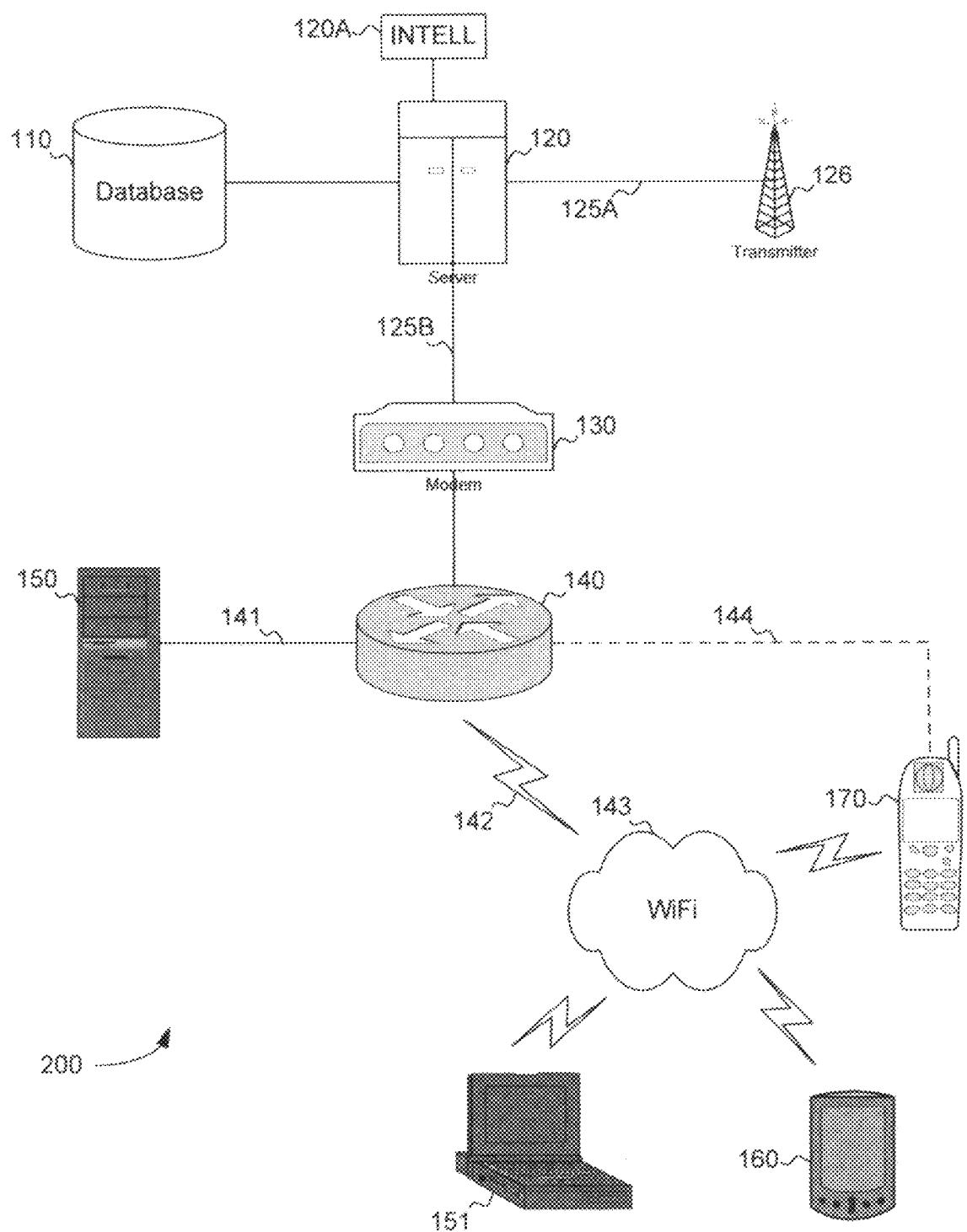
FIG. 2 shows several portable devices receiving large volume data files through a WiFi system according to an exemplary embodiment of the present invention.

In practice, many uses of the present invention are possible. One such non-limiting exemplary embodiment of a system 200 according to the present invention is shown in FIG. 2. Within system 200, a server 120 having intelligence 120A (part of or connected to) is in communication with database 110 that contains one or more application files, data files, streaming video or audio, television signals or other source of information that is desirable for a client or user. According to one exemplary embodiment of the present invention, server 120 and intelligence 120A can be part of a DESS, wherein intelligence 120A is an IICR containing a profile for the user, server 120 is an Application Server, and database 110 is a media resource center or hosts applications. When a user wants a particular application or data or video, for example, the user makes such request through a computer 150, cellular telephone 170, personal data assistant (PDA) 160 or other means to relay such request to the server 120. If the requested material (information, application, audio, video, etc.) does not take much network bandwidth or packet information or is needed immediately, then the requested material can be transmitted from the server 120 via a connector 125A to a cellular tower or transmitter 126 to a cellular telephone 170 or PDA 160 or other portable device 199 as defined above. Such a signal to such a portable device 199 will be packaged accordingly in an information packet that is transferable through cellular signal and receivable by the portable device 199 as a cellular signal.

However, if the requested material is large or may require a large bandwidth or other heavy use of the cellular telephone system, then an alternative route may be taken which directs the requested material from server 120 through a landline, cable, DSL, T-1 or other wireline route 125B to a home, office or other pre-determined location of the requester. For sake of simplicity, the requester is considered to be at home. Thus, the requested material is transmitted from server 120 through wireline route 125B to a modem 130 located within the home of the requester. The material may be further transmitted from modem 130 to router 140. From the modem 140, the information may be linked directly to a computer 150 through a suitable connector 141, such as an Ethernet cable. Alternatively, the material may be directed to the cellular telephone 170 directly through a suitable connector 144 (or through connection using computer 150 as intermediate). Yet another alternative would be available through the use of a wireless router 140 that transmits a signal 142 to create a WiFi region 143. Various devices, including WiFi-compatible computers 151, PDAs 160 and cellular telephones 170 can then communicate with the router 140 through the WiFi 143 signals created by the router 140. Furthermore, large files, data and packets can more easily be transmitted to the cellular telephone 170 using WiFi 143 or direct wireline connection 144 than by conventional cellular wireless communication with the cellular tower or transmitter 126. It should be kept in mind that whichever pathway the information packet will travel to arrive at the portable device 199 will be directly considered by the intelligent server 120 as it packages the packet of information to send to the portable device 199.

Furthermore, because of the higher bandwidth and lower cost of data transmission using the wireline route 125B than through cellular transmission 125A, the overall costs to the cellular service provider and cellular user could be decreased significantly.

Exactly which route the information packet uses, in this example being either pathway 125A or 125B, will be determined by the intelligence 120A in communication with the server 120 as a result of consideration of what pathways 121, 122, 123, 124 (see FIG. 1) are available to the portable device(s) 199. Such determination may be made in consideration of location registry of the portable device 199 and continued update of such registry as the portable device 199 enters and exits certain geographical regions. This local registry can be stored in a database within the intelligence 120A acting as an IICR, thereby dynamically generating a profile of pathways 121, 122, 123, 124 for the user. Alternatively, intelligence 120A may be able to determine the types of pathways 121, 122, 123, 124 available to a portable device 199 depending on the format of the data that is received from the portable device 199. Depending on the pathways 121, 122, 123, 124 used, different formats may be used. This information can be defined either by the user in his personal profile within the intelligence 120A, or dynamically generated by referring to existing rules and community profiles within the IICR. Also, intelligence within the portable device 199 itself may continuously or intermittently determine the optional pathways 121, 122, 123 and 124 that are available to it as a route to the server 120. Such device intelligence is then used to relay a message to the server intelligence 120A that certain given pathways 121, 122, 123, 124 are available so packets of information should be packaged to be sent through such a pathway 121, 122, 123, 124. Other modes of informing the intelligence 120A of server 120 of the most efficient available pathways 121, 122, 123, 124 are also possible and within the scope of the present invention.

Using a more specific example, when a subscriber to the system desires content from a basketball game, the content may be formatted for full length high definition utilizing an IP enabled television set. The same content may be formatted using a lower definition signal for a low grade DSL connection to a PC and the same content formatted in quarterly highlights only for a mobile device. Depending on a predefined parameter such as location or proximity to a higher bandwidth connection, the content will be applied to the specific device for later viewing. For instance, the 802.11 home based network could be used to download higher bandwidth-dependent content to a mobile device 160 or 170 while it is in "idle" state or at off peak hours such as the time frame between 12:00 A.M. and 4:00 A.M. Or any content may be downloaded utilizing broadband throughput for automatic downloads of content while registered on Wi-Fi. The content may consist of various forms-including but not limited to: News updates, music files, photos, traffic updates, email and SMS, to name a few.

The customer would benefit by having access to large files that can easily be pushed to the phone 170 by Wi-Fi 143 without waiting for incremental updates by the 2G or 3G macro network. A wireless service provider would benefit by utilizing the most efficient means of transporting packet based information/data. For instance, large downloads of data could be done over the broadband network and then automatically transferred to the mobile device for later use utilizing a Wi-Fi connection prior to leaving the home and entering the Macro cell (2G/3G) network.

End users would select the choice of content that they would want by accessing a website from their IP enabled device (e.g., TV, phone or PC). On that portal, the customer would have access to purchase and download music files (e.g., full mp3s or ringtones) that could be downloaded or streamed over the customer's broadband connection or video files in the same means. Customers could also request for email or other non-real-time applications to be pushed such as a selection of news or traffic provided through a menu of options (Business, Sports, AP wire, Entertainment, Selected Stock updates, Traffic by Zip Code, etc.). Alternatively, various types and formats of relevant data can be automatically generated by the server 120 and intelligence 120A in combination acting as a DESS, wherein the subscriber's profile is stored within IICR 120A and preferred formats can be defined by either the customer or the mobile operator for certain bandwidth and connection types.

The content/application can respond differently based on the network in which the subscriber is currently a part of. The subscriber will also have the option to push content/applications to other devices simultaneously in order to provide these differing levels of experience. For instance a subscriber may want to watch the highlights from the prior night's basketball game on a handheld mobile device while on the Macro Cell network and then watch the full game that same night which has been recorded to an IPTV DVR. One of the many unique abilities of the present invention is that the location of the mobile device on various networks will determine how content is transported along with the formatting and presentation of that content.

The dynamic management of the customer profile by the IICR according to the present invention creates the ability for customers to set preferences in a more feature-rich environment for content by time of day and location. Scenario Based Services allow customers to define criteria for content and preferences similar to myYahoo and TiVo, but with profiles that would adjust when customers want different content. Customers can manage their profiles for interaction with a wide array of sources in the home like a PC 150, 151 or DVR to access content, but also intuitively offer up other options for desirable content based on similarities in chosen content. This will allow wireless service providers the ability to introduce and market new applications. For example, if a customer wants news articles on favorite sports team, the profile manager can suggest highlight clips that can be downloaded automatically over WiFi 143 based on content stored on the DVR. The present invention introduces the concept of taking existing lengthy content like a three hour baseball game, reformatting a portion of that content to the mobile device 199 and transporting it via Wi-Fi 143 or broadband 144 or both.

A more specific example of this service offering will now be presented. Although these examples are reflective of the capabilities of this invention, they are not the limits of the abilities of the invention. Many other functions and abilities, even if not specifically outlined herein or provided by way of example, are still within the purview of one having ordinary skill in the art.

In one exemplary embodiment, an end user has interest in following his favorite sports team but can't stay up late at night to watch the end of the game. However, he has set his WiFi profile to download the news article from the local newspaper with ESPN video highlights for when he wakes up. The end user has the ability to read and watch all that he needs to about the game without having to stream or engage a download—his preferences are already known and his content is waiting for him when he wakes up. The end user is then asked if he wants to view a mobile version of the game on his handset. He also has the option to wait and view the entire content on other devices such as an IPTV DVR. Coincidentally there is another game scheduled for tonight and he is notified via a messaging system that recording of this game is also possible.

He has also requested from the IICR a (predetermined profile) traffic update for his drive to work. Based on the pattern of his drive that the Network is able to follow, or one that he has outlined on the portal, the profile manager not only provides indications of where congestion lies on his path, but also suggests alternate routes. This information is collected and disseminated once again to multiple IP enabled sources so that the subscriber has access to them on his/her IPTV, PC or handheld. After leaving the broadband network location, updates are performed to the traffic profile based on current data and sent via the Macro Cell network.

When the subscriber leaves the Wi-Fi 143 space, the portal adjusts to a new profile based on rules that the customer has determined for the macro network. Depending on the type of user, the customer could choose a work preference for business-related updates or call management. The end user is now out on the macro network and will receive incremental updates and does not need large volume downloads. The large file downloads are handled by Wi-Fi 143 overnight or in the early morning. The GSM/UMTS network will give updates to the profile and user as necessary such as updates on traffic on the way to work. Email and news updates will be lower count and incremental throughout the day as opposed to large volume downloads that benefit from being offset to broadband 144 and Wi-Fi 143. The end user may have selected a work profile and to have all missed calls route to his work voicemail. An added benefit to this model is network efficiency in that content/information/applications can be delivered deterministically and with more cost effective network bandwidth.

Wireless service providers can offset downloads to other companies as well as take advantage of time dependencies for network traffic. For instance, a subscriber in Atlanta could download traffic information prior to engaging the 2G/3G network thus transferring the larger traffic load. By the same token, incremental changes to the content can be delivered efficiently to the mobile device after the subscriber has left the broadband or Wi-Fi 143 network.

As the end user returns home at night, the network hands over to Wi-Fi 143 and one profile turns over to another. In this arena, the end user switches out of call routing based on his work preferences to a personal setting. Calls to his dual mode from certain selected phone numbers will route directly to his work voicemail without ringing his dual mode device. All other calls will ring the dual mode handset, but those that are unanswered will be sent to his home landline voicemail because he has defined his My Evening profile as a home, family profile.

Using the Wi-Fi 143 network, the end user can now easily transfer music files from the PC 150, 151 to his dual mode device without having to transfer via a USB connection. The end user has the flexibility to move around the house as he downloads 10 new songs he purchased via the portal. The end user chose the option for the download to occur automatically when he entered the Wi-Fi 143 space in his home, adding the convenience of not having to initiate the transfer from his device and PC 150, 151. The profile manager, or DESS system, dynamically determined that the end user has moved from the macro network to the micro network and that the large volume of files would be best transported to the device in the Wi-Fi 143 space.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a server; and
an intelligence module that:
   receives an indication that a portable device that is connected to a cellular network via a cellular connection has requested a packet of data from the server;
   determines, using a location register associated with the cellular network, a first geographic location at which the portable device is located;
   accesses a database that stores storing a profile associated with the portable device, the profile comprising:
      the first geographic location;
      preferences comprising settings that, wherein the setting define how the packet of data is transmitted based upon a time of day at which the packet of data is requested, a location at which the portable device is located when the packet of data is requested, and a size of the packet of data that is requested by the portable device; and information identifying a second geographic location at which a landline computer associated with the portable device is located, wherein the first geographic location of the profile is updated as the portable device moves from the first geographic location to the second geographic location;

determines, based upon the first geographic location and the second geographic location, a plurality of pathways comprising a plurality of traffic routes, each pathway of the plurality of pathways comprising:

a traffic route for the packet of data between the server and one of the portable device and the landline computer; and an indication of whether a broadband connection is available to transfer the packet of data along the pathway;

selects, based upon the first geographic location, the second geographic location, the size of the packet of data requested, a cost of transmitting the packet of data, and the profile, a communication pathway through which the packet of data is to be routed to one of the portable device and the landline computer, the communication pathway comprising a most efficient communication pathway that is available;

packages the packet of data according to a pre-determined format that is based upon the most efficient communication pathway; and transmits the packet of data in the pre-determined format via the most efficient communication pathway, wherein the packet of data is associated with video.

2. A system comprising:

a server that transmits a packet of information requested by a portable device, wherein the packet of information is requested by the portable device over a cellular connection via which the portable device connects to a cellular network; and an intelligence module that: receives an indication that the portable device has requested the packet of information from the server;

determines, using a location register associated with the cellular network, a first geographic location at which the portable device is located;

accesses a database that stores storing a profile associated with the portable device, the profile comprising:

the first geographic location;

preferences comprising settings that, wherein the setting define how the packet of information is transmitted based upon a time of day at which the packet of information is requested, a location at which the portable device is located when the packet of information is requested, and a size of the packet of information that is requested by the portable device; and information identifying a second geographic location at which a landline computer associated with the portable device is located, wherein the first geographic location of the profile is updated as the portable device moves from the first geographic location to the second geographic location;

determines, based upon the first geographic location and the second geographic location, a plurality of pathways comprising:

a traffic route for the packet of information between the server and one of the portable device and the landline computer; and an indication of whether a broadband connection is available to transfer the packet of information along the pathway;

selects, based upon the first geographic location, the second geographic location, the size of the packet of information requested, a cost of transmitting the packet of information, and the profile, a communication pathway through which the packet of information is to be routed to one of the portable device and the landline computer, the communication pathway comprising a most efficient communication pathway that is available; packages the packet of information according to a pre-determined format that is based upon the most efficient communication pathway; and transmits the packet of information in the pre-determined format via the most efficient communication pathway, wherein the packet of data is associated with video.

3. A system comprising:

a server that transmits a packet of information in response to receiving a request for the packet of information from a portable device that communicates with the server over a cellular connection via which the portable device communicates with a cellular network, wherein the server communicates with:

a wireless router that is capable of transmitting the packet of information; and a landline router that is capable of transmitting the packet of information; and an intelligence module that:

receives an indication that the portable device has requested the packet of information from the server;

determines, using a location register associated with the cellular network, a first geographic location at which the portable device is located;

accesses a database that stores storing a profile associated with the portable device, the profile comprising:

the first geographic location;

preferences comprising settings that, therein the setting define how the packet of information is transmitted based upon a time of day at which the packet of information is requested, a location at which the portable device is located when the packet of information is requested, and a size of the packet of information that is requested by the portable device; and information identifying a second geographic location at which a landline computer associated with the portable device is located, wherein the first geographic location of the profile is updated as the portable device moves from the first geographic location to the second geographic location;

determines, based upon the first geographic location and the second geographic location, a plurality of pathways comprising:

a traffic route for information between the server and one of the portable device and the landline computer; and an indication of whether a broadband connection is available to transfer the packet of information along the pathway;

selects, based upon the first geographic location, the second geographic location, the size of the packet of information requested, a cost of transmitting the packet of information, and the profile, a communication pathway through which the packet of information is to be routed to one of the portable device and the landline computer, the communication pathway comprising a most efficient communication pathway that is available;

packages the packet of information according to a pre-determined format that is based upon the most efficient communication pathway; and transmits the packet of information in the pre-determined format via the most efficient communication pathway, wherein the packet of data is associated with video.

4. A method comprising:

receiving, by a system comprising:

a server and an intelligence module, an indication that a portable device has requested a packet of data from the server, the request being received over a cellular connection via which the portable device connects to a cellular network;

determining, by the system and using a location register associated with the cellular network, a first geographic location at which the portable device is located;

accessing, by the system, a database that stores storing a profile associated with the portable device, the profile comprising:

the first geographic location;

preferences comprising settings that, therein the setting define how the packet of data is transmitted based upon a time of day at which the packet of data is requested, a location at which the portable device is located when the packet of data is requested, and a size of the packet of data that is requested by the portable device; and information identifying a second geographic location at which a landline computer associated with the portable device is located, wherein the first geographic location of the profile is updated as the portable device moves from the first geographic location to the second geographic location;

determining, based upon the first geographic location and the second geographic location, a plurality of pathways comprising:

a traffic route for the packet of data between the server and one of the portable device and the landline computer; and an indication of whether a broadband connection is available to transfer the packet of data along the pathway;

selecting, based upon the first geographic location, the second geographic location, the size of the packet of data requested, a cost of transmitting the packet of data, and the profile, a communication pathway through which the packet of data is to be routed to one of the portable device and the landline computer, the communication pathway comprising a most efficient communication pathway that is available;

packaging the packet of data according to a pre-determined format that is based upon the most efficient communication pathway; and transmitting the packet of data in the pre-determined format via the most efficient communication pathway, wherein the packet of data is associated with video.

5. The method of claim 4, further comprising transmitting the packet of data according to a pre-determined time schedule.

6. A method comprising:

receiving, by a system comprising a server and an intelligence module, an indication that a portable device has requested data from the server, the request being received from the portable device via a cellular connection via which the portable device connects to a cellular network;

determining, by the system and using a location register associated with the cellular network, a first geographic location at which the portable device is located;

accessing, by the system, a database that stores storing a profile associated with the portable device, the profile comprising:

the first geographic location;

preferences comprising settings that, wherein the setting define how the data is transmitted based upon a time of day at which the data is requested, a location at which the portable device is located when the data is requested, and a size of the data requested by the portable device; and information identifying a second geographic location at which a landline computer associated with the portable device is located, wherein the first geographic location of the profile is updated as the portable device moves from the first geographic location to the second geographic location;

determining, based upon the first geographic location and the second geographic location, a plurality of pathways comprising:

a traffic route for the data between the server and one of the portable device and the landline computer; and an indication of whether a broadband connection is available to transfer the data along the pathway;

selecting, based upon the first geographic location, the second geographic location, the size of the data requested, a cost of transmitting the data, and the profile, a communication pathway through which the data is to be routed to one of the portable device and the landline computer, the communication pathway comprising a most efficient communication pathway that is available;

packaging the data according to a pre-determined format that is based upon the most efficient communication pathway; and transmitting the data in the pre-determined format via the most efficient communication pathway, wherein the packet of data is associated with video.

7. The method of claim 6, further comprising transmitting the data according to a pre-determined time schedule.

* * * * *